March 5, 1929. J. R. MOFFATT Re. 17,229

DIFFERENTIAL FEEDING MECHANISM

Original Filed Oct. 20, 1921 3 Sheets-Sheet 1

Inventor.

James R. Moffatt.

By Sturtevant & Mason

Attorneys.

March 5, 1929.

J. R. MOFFATT

DIFFERENTIAL FEEDING MECHANISM

Re. 17,229

Original Filed Oct. 20, 1921

3 Sheets-Sheet 2

Inventor

James R. Moffatt

By Shurtleff & Mason

Attorneys

March 5, 1929.
J. R. MOFFATT
DIFFERENTIAL FEEDING MECHANISM
Re. 17,229
Original Filed Oct. 20, 1921
3 Sheets-Sheet 3
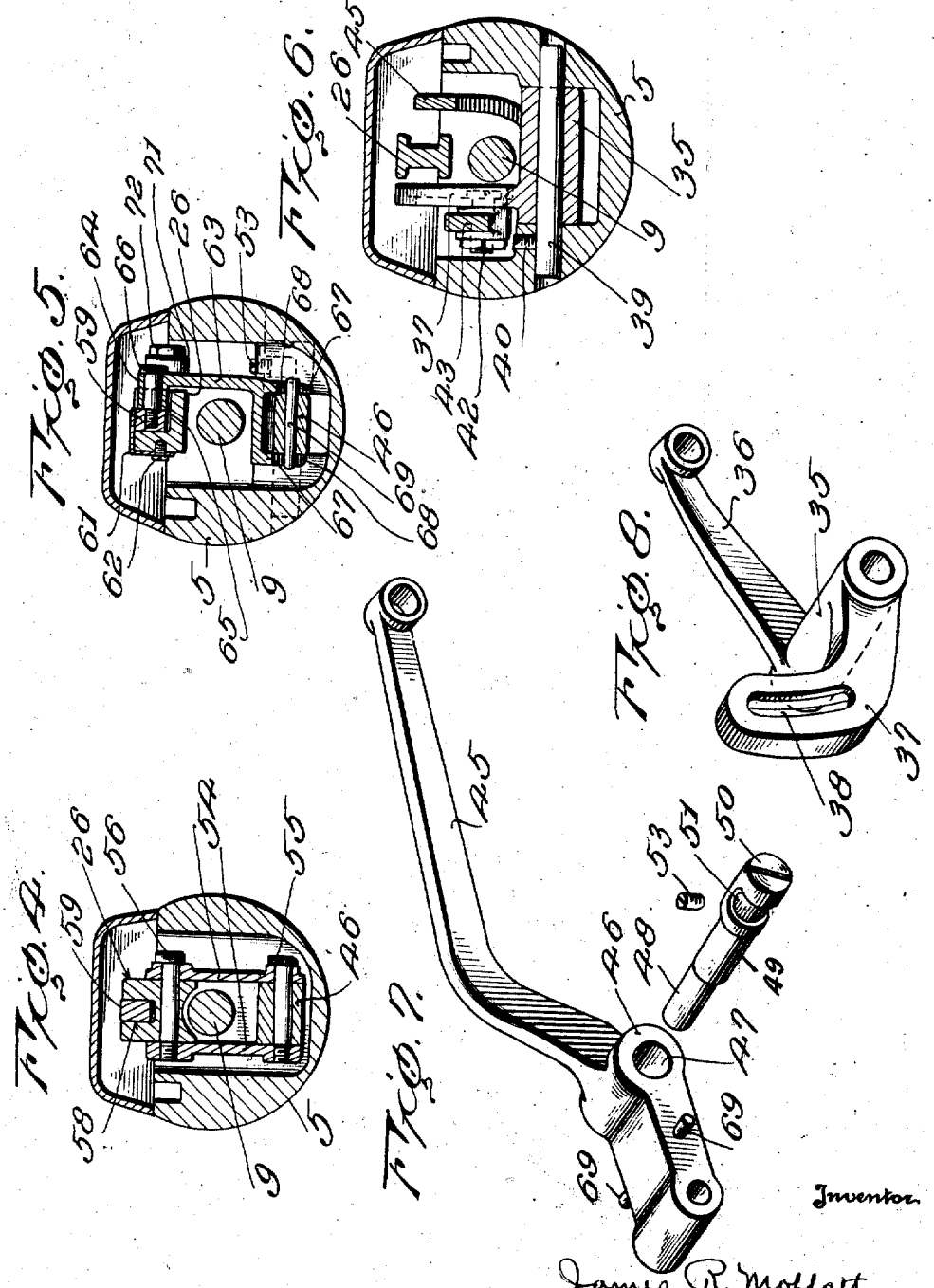
Inventor.
James R. Moffatt
By Sturtevant & Mason
Attorneys.

Reissued Mar. 5, 1929. Re. 17,229

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

DIFFERENTIAL FEEDING MECHANISM.

Original No. 1,534,132, dated April 21, 1925, Serial No. 508,931, filed October 20, 1921. Application for reissue filed December 31, 1928. Serial No. 329,627.

The invention relates to new and useful improvements in differential feeding mechanisms for sewing machines, and more particularly a differential feeding mechanism which is adapted to be used in a comparatively small work supporting arm.

An object of the invention is to provide a differential feeding mechanism for a work supporting arm which is so constructed that the feed dog may be raised and lowered with little or no tilting of the feed dog from front to rear, or vice versa.

A further object of the invention is to provide a differential feeding mechanism of the above character, wherein the auxiliary feed bar is supported by a main feed bar, so as to move up and down therewith and wherein said main feed bar extends substantially the entire length of the work supporting arm and is pivotally and slidably supported at the inner end thereof, so that the swinging movements of the feed bar to raise and lower the feed dogs will cause said feed dogs to move bodily vertically with little or no tilting of the feed dogs from front to rear or vice versa.

A further object of the invention is to provide a differential feeding mechanism of the above type wherein the work engaging movements of the feed dogs and the feeding movements of the feed dogs are secured from two levers fulcrumed in the work supporting arm and extending to points within a vertical frame member carrying the work supporting arm so that eccentric straps in said vertical frame member may be connected to and operate said levers.

These and other objects will in part be obvious and will in part be hereinafter more fully disclosed.

In the drawings which show by way of illustration one embodiment of the invention:—

Figure 4 is a sectional view on the line 4—4 of Figure 1;

Figure 5 is a sectional view on the line 5—5 of Fig. 1;

Figure 6 is a sectional view on the line 6—6 of Figure 1;

Figure 7 is a perspective view of the lever for raising and lowering the main feed bar and the fulcrum pin therefor, said pin being separated from the lever to show the eccentric construction for shifting the position of the fulcrum of the lever;

Figure 8 is a perspective view of the lever for moving the feed bar back and forth;

Figures 1, 9:
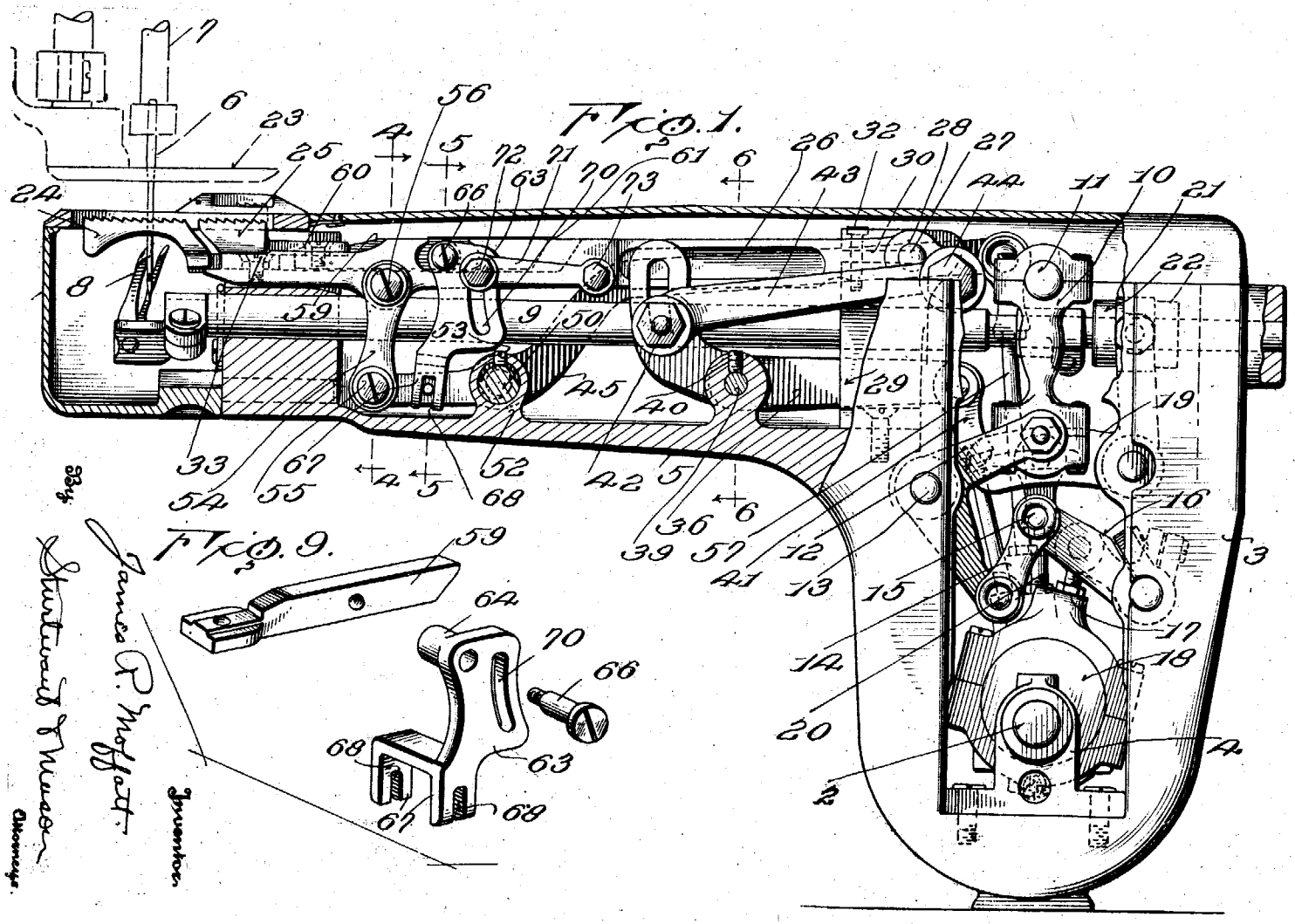
Figure 1 is a view partly in vertical section and partly in side elevation, showing a portion of a sewing machine with my improved differential feeding mechanism embodied therein.
Figure 9 is a perspective view of the auxiliary feed bar and the lever which moves the same back and forth.

I have shown the invention as applied to a sewing machine of the type disclosed in the patent granted to Lansing Onderdonk December 18, 1906, No. 839,077. Said machine has a frame member extending horizontally and parallel with the overhanging arm. The machine has been illustrated only in part in the drawings and reference should be had to said patent for a better understanding of the complete machine.

In the present drawings the horizontally extending member referred to is indicated at 1 and in said horizontally extending member is an operating shaft 2 which is driven through suitable connections from the main shaft. Projecting vertically from the horizontally projecting frame member 1 is a vertical frame member 3. The shaft 2 projects into the vertical frame member 3 and the end thereof is mounted in a bracket 4. Formed integral with the vertical frame member 3 is a work supporting arm 5 which is relatively small and which projects laterally from said vertical frame member to a point underneath the needles. The needles are indicated at 6 in the drawings and are carried by a needle bar 7. Cooperating with the needles 6 is a thread looper 8 which is carried by a looper shaft 9. Said looper shaft 9 is mounted in suitable bearings in the work supporting arm 5 and the vertical frame member 3, so that the shaft may be oscillated and also moved endwise for giving the proper movements to the looper. The looper supporting shaft 9 is oscillated by means of a link 10 which is connected to a radial arm 11 fixed to the looper supporting shaft 9. This link 10 at its lower end is connected to one arm of a rock lever 12, which is pivoted at 13 to the vertical frame member 3. The other arm of the rock lever is pivoted to a link 14 which in turn is pivoted at 15 to an arm 16. The arm 16 is connected to an eccentric strap 17 which cooperates with an eccentric 18 on the operating shaft 2. The looper supporting shaft 9 is moved endwise by means of a rock lever 19 which is connected to an eccentric strap 20 cooperating with an eccentric on the shaft 2. This rock lever has a forked arm which is connected to a collar 21 free on the looper shaft and located between spaced collars 22—22 attached to the looper shaft. As this rock lever 19 is oscillated the looper supporting shaft is moved endwise and as the link 14 and arm 16 which form toggle links are moved toward and from a center line the looper is moved into and out of the needle thread loop and a dwell is given to the oscillation of the looper at the forward end of its stroke. This looper mechanism which has been referred to briefly forms no part of the present invention but is shown, described and claimed in my copending application filed of even date herewith.

The material being stitched is held on the work support by a presser foot shown diagrammatically and in broken lines at 23 in the drawings. The material is fed off from the end of the arm as it is stitched and this is brought about by two feed dogs—the main feed dog 24 and an auxiliary feed dog 25. The main feed dog 24 is carried by a main feed bar 26 which extends lengthwise of the work supporting arm 5. Said feed bar 26 at its rear end carries a pivot pin 27 which is located in the openings 28 in the feed bar. The bracket 29 carried by the work supporting frame is slotted at 30. The pivot pin 27 has a reduced section 31 which is adapted to fit in this slot 30 and slide back and forth therein. A screw 32 passes down through the bracket and closes the slot 30. Through this construction the feed bar is capable of being moved endwise as the pin slides in the slot. It may also be raised and lowered at its free end, said bar turning freely on the cylindrical ends of the pivot pin 27. The main feed dog is secured to the main feed bar by a screw 33, see Fig. 1. The main feed bar is moved endwise for imparting feeding movements to the feed dog 24 by means of a lever 34. Said lever 34 is shown more in detail in Fig. 8 and consists of a central sleeve 35, a rearwardly projecting arm 36 and a forwardly projecting arm 37. Said last named arm is provided with a curved slot 38. The sleeve 35, as clearly shown in Fig. 6 of the drawings, is mounted on a pin 39 which is secured in the work supporting arm by means of a set screw 40. The lever rocks freely on this pin. The rear end of the lever 34 is pivotally connected to an eccentric strap 41 which cooperates with an eccentric on the main shaft.

Adjustably mounted in the slot 38 is a stud 42. A link 43 is pivotally connected to this stud at its forward end, and this link is pivotally connected at its rear end to a stud 44 which in turn is mounted in the opening 45ᵃ in the rear end of the feed bar 26.

It will be seen that as the operating shaft 2 rotates the eccentric strap 41 will rock the lever 34. Said lever as it rocks will give an endwise movement to the link 43 and this will impart an endwise movement to the feed bar 26. By adjusting the position of the stud 42 the extent of movement imparted to the main feed bar may be varied.

The main feed bar is raised and lowered by means of a lever 45. Said lever is shown in perspective in Fig. 7 of the drawings. The lever is provided with a sleeve 46 having an opening 47 through which a pivot pin 48 extends. This pivot pin 48 has an eccentric section 49 and a slotted head 50. The slotted head is cut away on one side, as indicated at 51. When the pin is in place, the eccentric section 49 is located in the sleeve 46. This pivot pin is mounted in bearing lugs 52—52 carried by the work supporting arm 5. A set screw 53 passes down through the top of one of the lugs and into the cut away portion 51 and is adapted to clamp the pivot pin against movement. By loosening this set screw a suitable tool may be placed in the slot of the head 50, and the pivot pin turned so as to shift the position of the eccentric section 49 and this will raise or lower the fulcrum axis of the lever 45. The lever 45 at its forward end is connected to two spaced links 54—54. These spaced links 54—54 are arranged on opposite sides of the forward end of the lever and are secured thereto by a pivot pin 55. The links at their upper end are secured to the feed bar by a pivot pin 56. The lever 45 is connected at its rear end to an eccentric strap 57 which cooperates with an eccentric on the shaft 2. As the shaft 2 rotates the lever 45 will be oscillated and this will raise and lower the main feed bar. By shifting the position of the eccentric portion 49 the fulcrum of the lever 45 may be raised and lowered and thus the working position of the said lever varied and this will vary the position of the up and down movements of the feed bar, and the feed dog carried thereby.

The feed bar 26 is provided with a longitudinal slot 58 in the upper face thereof. Mounted in said slot is an auxiliary feed bar 59 to which the auxiliary feed dog is secured by means of a screw 60. Attached to the main feed bar is an angle plate 61. Said plate is secured to the feed bar by means of screws 62—62 and is so positioned as to overlap the auxiliary feed bar 59 and this plate confines the auxiliary feed bar to endwise movements only relative to the main feed bar. All up and down movements of the main feed bar are imparted to this auxiliary feed bar 59.

Figures 2, 3:
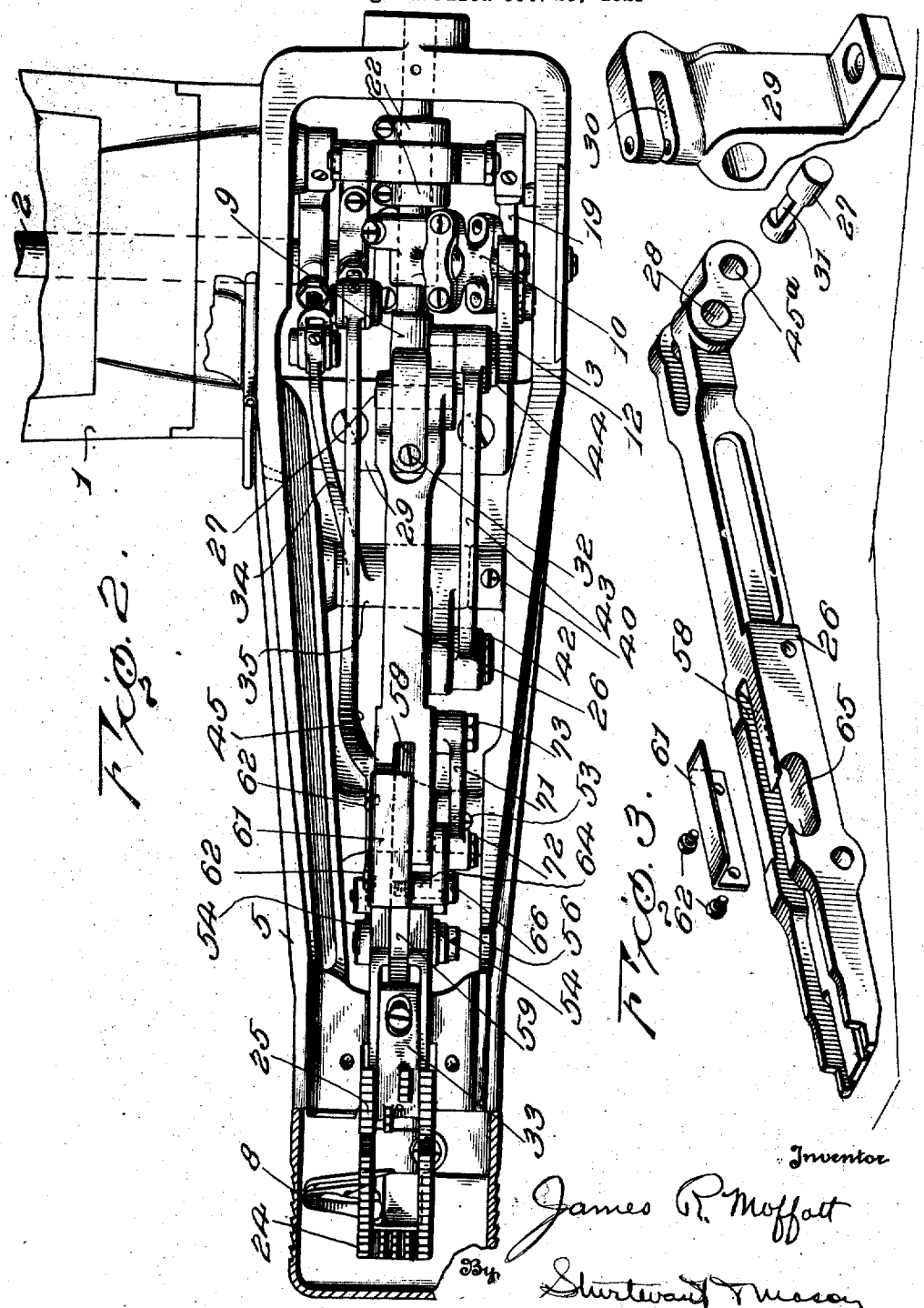
Figure 2 is a plan view of the work supporting arm, the vertical frame member carrying the same and a portion of the horizontal frame member on the end of which the vertical frame member is mounted.
Figure 3 is a perspective view of the main feed bar, the bracket which pivotally and slidably supports the same and the pivot pin, the parts being separated to more clearly show the structure.

The auxiliary feed bar 59 is moved back and forth by means of a lever 63. This lever 63 is shown in perspective view in Fig. 9. Said lever 63 is provided with a projecting sleeve 64 at its upper end. Said sleeve is located in a cut-away portion 65 in the feed bar, see Figs. 1, 3 and 5. A pivot screw 66 extends through the sleeve and is threaded into the auxiliary feed bar so that the lever is thus pivotally connected to the auxiliary feed bar. The lever at its lower end carries spaced arms 67—67, which extend down at each side of the forward portion of the lever 45. Each arm is forked at 68. The lever 45 carries pins 69—69, one at each side of the lever and these forked ends of the lever 63 engage over said pins 69—69. These pins act as a fulcrum for the lever 63. Said lever is also provided with a segmental slot 70. A link 71 is pivoted at its forward end to a stud 72, adjustably mounted in the slot 70. The other end of this link 71 is pivoted at 73 to the main feed bar.

As the main feed bar moves back and forth it will oscillate the lever 63, swinging the same about the fulcrum pin 69. This is accomplished through the link connection 71. Inasmuch as the lever 63 is connected to the auxiliary feed bar it will move the auxiliary feed bar endwise on the main feed bar provided the stud 72 is below a line passing through the pivot bolt 66 and the pivot pin 73. In other words, the distance from the stud 72 to the fulcrum 69 is less than the distance from the pivot pin 66 to said fulcrum 69. This movement of the auxiliary feed bar on the main feed bar can, of course, be increased by lowering the stud 72 in the slot 70. Thus it is that a different movement can be imparted to the auxiliary feed dog from that which is imparted to the main feed dog and this constitutes what is well known in the art as a differential feeding mechanism. The auxiliary feed dog moves the fabric to a greater extent than the main feed dog and thus it is fulled in in front of the needles as the stitching goes on.

From the above description it will be apparent that I have provided a very simple differential feeding mechanism which consists of very few parts and wherein both the main feed dog and the auxiliary feed dog are operated from the same two eccentrics and at the same time a differential feeding movement is given to the different dogs. Then, again, it will be apparent that I have packed my entire feeding mechanism in the work supporting arm and the various movements are imparted to the feed dogs from two levers projecting rearwardly into the vertical frame member where they may be readily connected to eccentric straps and operated from rotating eccentrics at the lower end of the vertical frame member.

It is obvious that minor changes in the details of construction and the arrangement of the parts may be made without departing from the spirit of the invention as set forth in the appended claims.

Having thus described my invention, what I claim as new and desire to secure by Letters Patent is:

1. The combination with a vertically extending frame member, a work supporting arm at the upper end thereof projecting laterally therefrom, an operating shaft extending into said frame member, a main feed dog, a main feed bar extending lengthwise of the work supporting arm and terminating adjacent said frame member, means for moving said feed bar back and forth including a lever pivoted to the work supporting arm alongside of said main feed bar and extending into the vertically extending frame member, devices actuated by the operating shaft for oscillating said lever, a link connected with the lever at a point intermediate the ends of the main feed bar and extending rearwardly and pivotally connected to the rear end of the main feed bar, an auxiliary feed dog, an auxiliary feed bar supporting said auxiliary feed dog and extending lengthwise of the work supporting arm, means for imparting a differential movement to the auxiliary feed bar, and means for raising and lowering said feed bars.

2. The combination of a vertically extending frame member, a work supporting arm at the upper end thereof projecting laterally therefrom, an operating shaft extending into said frame member, a main feed dog, a main feed bar extending lengthwise of the work supporting arm and terminating adjacent said frame member, an auxiliary feed dog, an auxiliary feed bar supported by said main feed bar and carrying said auxiliary feed dog, means for moving the feed bars back and forth including a lever pivoted in the work supporting arm alongside of the main feed bar and extending into the vertical frame member, devices actuated by the operating shaft for oscillating said lever, a link connected with the lever at a point intermediate the ends of the main feed bar and extending rearwardly and pivotally connected to the rear end of the main feed bar, devices for imparting a differential movement to the auxiliary feed dog from said main feed bar, and means for raising and lowering said feed dogs.

3. The combination with a vertically extending frame member, a work supporting arm located at the upper end thereof and projecting laterally therefrom, an operating shaft extending into said frame member, a main feed bar extending lengthwise of the work supporting arm and terminating adjacent the vertically extending frame member, a main feed dog carried by said main feed bar, an auxiliary feed dog supported by said main feed bar and movable up and down therewith, a lever located in said work supporting arm alongside of said main feed bar, links connecting said lever with the main feed bar for raising and lowering the feed dogs, said lever extending into said vertical member, means for operating said lever from said shaft, a second lever located alongside of said main feed member and extending into said vertical member, means for oscillating said second lever from said shaft, a link having adjustable connection with the outer end of said lever and with the feed bar at the extreme inner end thereof for moving the feed bar back and forth, and means for imparting a differential movement to the auxiliary feed dog from said main feed bar.

4. The combination with a vertically extending frame member, a work supporting arm located at the upper end thereof and projecting laterally therefrom, an operating shaft extending into said frame member, a main feed bar extending lengthwise of said arm and terminating adjacent the vertically extending frame member, means for pivotally supporting the inner end of said feed bar whereby the same may slide back and forth, a lever located in said arm alongside of the feed bar and extending rearwardly into said vertical member, means for oscillating said lever from said shaft, a link having adjustable connection with the outer end of said lever and the inner end of said feed bar adjacent the pivot therefor, an auxiliary feed dog carried by said main feed bar and movable up and down therewith, means for giving said auxiliary feed dog a differential movement from said main feed bar, a second lever located in said arm alongside of said main feed bar and projecting rearwardly into said vertical member, means for operating said lever from said shaft, and a pair of links connected with the outer end of said last-named lever and with the main feed bar for raising and lowering the same.

5. The combination with a vertically extending frame member, a work supporting arm located at the upper end thereof, and projecting laterally therefrom, an operating shaft extending into said frame member, a main feed bar extending lengthwise of said arm and terminating adjacent the vertically extending frame member, means for pivotally supporting the inner end of said feed bar whereby the same may slide back and forth, a lever located in said arm alongside of the feed bar and extending rearwardly into said vertical member, means for oscillating said lever from said shaft, a link having adjustable connection with the outer end of said lever and the inner end of said feed bar adjacent the pivot therefor, an auxiliary feed dog carried by said main feed bar and movable up and down therewith, means for giving said auxiliary feed dog a differential movement from said main feed bar, a second lever located in said arm alongside of said main feed bar and projecting rearwardly into said vertical member, means for operating said lever from said shaft, a pair of links connected with the outer end of said last-named lever and with the main feed bar for raising and lowering the same, said means for moving the auxiliary feed dog back and forth including a lever pivotally connected to said auxiliary feed dog, a link having an adjustable connection with said last-named lever and with the main feed bar, and means serving as a fulcrum for said last-named lever.

6. The combination with a vertically arranged frame member, a work supporting arm located at the upper end thereof and projecting laterally therefrom, an operating shaft extending into said frame member, a main feed bar extending lengthwise of said arm, a main feed dog carried thereby, an auxiliary feed bar supported by the main feed bar, an auxiliary feed dog carried by said auxiliary feed bar, means operated from said shaft for raising and lowering said feed bars, means operated from said shaft for moving said main feed bar back and forth, a lever pivotally connected at its upper end to said auxiliary feed bar, a link having an adjustable connection with said lever and connected to said main feed bar, said lever at the lower end thereof being forked, and a fulcrum pin extending through said forked end of the lever whereby said lever may rock on said fulcrum pin and impart feeding movements to the auxiliary feed dog, and may move up and down on the fulcrum pin with the up and down movements of the auxiliary feed bar.

7. The combination of a vertically extending frame member, a work supporting arm projecting laterally therefrom, an operating shaft extending into said frame member, a main feed dog, a feed bar carrying said main feed dog and extending lengthwise of said arm, means for pivotally and slidably supporting the inner end of said feed bar, said pivot being located at the inner end of said arm, an auxiliary feed dog, an auxiliary feed bar carried by said main feed bar, and movable up and down therewith, means for raising and lowering the feed bars, means for moving said main feed bar back and forth including a lever pivoted in said work supporting arm and extending alongside of said main feed bar into said vertically extending frame member, a link pivoted to said lever and to the feed bar at its inner end, devices actuated by the operating shaft and connected to said lever for oscillating the lever, a second lever connected to said auxiliary feed bar, and means for connecting said second lever to the main feed bar, whereby movements of a different extent may be imparted to said auxiliary feed bar from said main feed bar.

8. The combination of a vertically extending frame member, a work supporting arm projecting laterally therefrom, an operating shaft extending into said frame member, a main feed dog, a feed bar carrying said main feed dog and extending lengthwise of said arm, means for pivotally and slidably supporting the inner end of said feed bar, an auxiliary feed dog, an auxiliary feed bar carried by the main feed bar and movable up and down therewith, means for raising and lowering the feed bars, means for moving said main feed bar back and forth including a lever pivoted in said work supporting arm and extending into said vertical frame member, an eccentric on the operating shaft, an eccentric strap cooperating therewith and connected to said lever for oscillating said lever, said lever having a slotted arm, a link having an adjustable connection with said slotted arm and said main feed bar for moving said main feed bar back and forth, a second lever pivoted to said auxiliary feed bar, said second lever having a slotted portion, a link adjustably connected to said slotted portion and to the main feed bar for oscillating the lever connected to said auxiliary feed bar, and means for pivotally supporting said last named lever.

9. The combination of a vertically extending frame member, a work supporting arm projecting laterally therefrom, an operating shaft extending into said frame member, a main feed dog, a feed bar carrying said main feed dog and extending lengthwise of said arm, means for pivotally and slidably supporting the inner end of said feed bar, an auxiliary feed dog, an auxiliary feed bar carried by the main feed bar and movable up and down therewith, means for raising and lowering the feed bars including a lever pivoted in said work supporting arm and extending underneath the main feed bar, a pair of links connecting one end of said lever with the main feed bar, said lever at its other end extending into said vertical frame member, an eccentric strap connected thereto, an eccentric on said operating shaft with which said strap cooperates, means for moving said main feed bar back and forth including a lever pivoted in said work supporting arm and having one end thereof slotted, a link adjustably connected to said slotted end and to the main feed bar for moving it back and forth, the other end of said lever extending into said vertical frame member, an eccentric strap connected thereto and an eccentric on said operating shaft for operating said last named eccentric strap, a third lever in said work supporting arm having slotted spaced arms straddling the lever for raising and lowering the feed bar, pins carried by said lever and engaging said forked arms and forming a fulcrum for the lever, said lever being connected to the auxiliary feed bar and having a slotted portion, and a link adjustably connected to said slotted portion at one end and at its other end to said auxiliary feed bar.

In testimony whereof, I affix my signature.

JAMES R. MOFFATT.